United States Patent
O'Neill

(10) Patent No.: US 8,999,209 B2
(45) Date of Patent: Apr. 7, 2015

(54) METHOD AND SYSTEM OF MEASURING TORIC LENS AXIS ANGLE

(75) Inventor: Trevor F. O'Neill, Tramore (IE)

(73) Assignee: Bausch & Lomb Incorporated, Rochester, NY (US)

( * ) Notice: Subject to any disclaimer, the term of this patent is extended or adjusted under 35 U.S.C. 154(b) by 114 days.

(21) Appl. No.: 12/769,015

(22) Filed: Apr. 28, 2010

(65) Prior Publication Data

US 2011/0266703 A1 Nov. 3, 2011

(51) Int. Cl.
*B29D 11/00* (2006.01)
*G01M 11/02* (2006.01)

(52) U.S. Cl.
CPC ..... *B29D 11/00509* (2013.01); *G01M 11/0221* (2013.01)

(58) Field of Classification Search
CPC .................. B29D 11/00509; G01M 11/0221
USPC ......................................... 264/1.32; 425/171
See application file for complete search history.

(56) References Cited

U.S. PATENT DOCUMENTS

| | | | |
|---|---|---|---|
| 4,615,847 A * | 10/1986 | Howden | 264/1.7 |
| 5,611,970 A | 3/1997 | Apollonio et al. | |
| 5,733,585 A | 3/1998 | Vandewinckel et al. | |
| 6,197,227 B1 | 3/2001 | Appleton et al. | |
| 6,383,419 B1 * | 5/2002 | Dean | 264/2.5 |
| 6,638,362 B2 | 10/2003 | Dobner et al. | |
| 6,772,988 B2 | 8/2004 | Altmann | |
| 6,788,399 B2 | 9/2004 | Frumusa et al. | |
| 6,827,885 B2 | 12/2004 | Altmann et al. | |
| 7,346,416 B2 | 3/2008 | Wadding et al. | |
| 2002/0195732 A1 | 12/2002 | Clark et al. | |
| 2004/0104494 A1 * | 6/2004 | Bevis et al. | 264/2.5 |
| 2007/0176310 A1 | 8/2007 | Voss et al. | |

OTHER PUBLICATIONS

International Search Report (PCT/ISA/210) and Written Opinion PCT/ISA/237) mailed on Aug. 1, 2011.
EP Official Communication received in corresponding European Application No. 11716148.9-1503 Dated Oct. 8, 2014 (8 pages).

* cited by examiner

*Primary Examiner* — Alison Hindenlang
(74) *Attorney, Agent, or Firm* — Toan P. Vo

(57) ABSTRACT

A method of measuring an axis angle of a toric contact lens including a posterior toric central zone having a cylindrical axis, and an anterior lens surface forming a ballast that has an axis of orientation offset from the cylindrical axis at a selected rotational angle is disclosed. The method involves (a) providing anterior and posterior mold sections including respective anterior and posterior mold cavity defining surfaces, wherein the posterior mold cavity defining surface includes a toric central zone and the anterior mold cavity defining surface is shaped to provide the ballast, the mold sections being alignable at multiple rotational positions; (b) providing a detectable feature on each of the anterior and posterior mold sections at a predetermined angular location with respect to the tonic and ballast axes thereof, respectively; (c) rotating the detectable feature of the posterior mold section relative to the detectable feature of the anterior mold section, wherein the detectable feature of the anterior mold section is a zero reference; and (d) measuring the axis angle between the detectable feature of the posterior mold section relative to the detectable feature of the anterior mold section after rotational displacement of the mold sections during toric contact lens formation.

9 Claims, 2 Drawing Sheets

METHOD AND SYSTEM OF MEASURING TORIC LENS AXIS ANGLE

BACKGROUND OF THE INVENTION

1. Technical Field

The present invention generally relates to a method and system of measuring the axis angle of a toric lens prior to removing the lens from its mold.

2. Description of Related Art

Contact lenses having a toric optical zone (commonly referred to as "tonic contact lenses") are used to correct refractive abnormalities of the eye associated with astigmatism. The toric optical zone provides cylindrical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. Currently, both back toric lenses (having the tonic surface formed in the posterior lens surface) and front toric lenses (having the toric surface formed in the anterior lens surface) are available.

Whereas spherical contact lenses may freely rotate on the eye, toric contact lenses have a ballast to inhibit rotation of the lens on the eye so that the cylindrical axis of the tonic zone remains generally aligned with the axis of the astigmatism. For example, a section of the lens periphery may be thicker (or thinner) than another section to provide the ballast. Tonic contact lenses are manufactured with a selected relationship (or offset) between the cylindrical axis of the toric optical zone and the orientation of the ballast. This relationship is expressed as the number of degrees (rotational angle) that the cylindrical axis is offset from the orientation axis of the ballast.

Toric contact lenses, similar to spherical contact lenses, are usually offered in several different base curves, a lens parameter related to fitting characteristics of the lens, and several different spherical powers. Toric contact lenses, however, not only include the toric optical zone and ballast, but the lenses are offered with a range of cylindrical axis orientations in order to accommodate patients with different astigmatic conditions; for example, for a given base curve and spherical power, the cylindrical axis may be offered in 5 or 10 degree increments ranging from 0° to 180°. Typically, a toric lens will be thicker on the bottom, i.e., 180 degrees, to create a "ballast" to aid in self-alignment when the eye blinks. Thus, when manufacturing tonic lenses, the axis angle must be accurately measured to ensure that the lens has the proper shape to correct any given patient's astigmatism.

A toric lens prescription defines the axial offset (expressed in degrees) between the toric axis and the ballast axis of the posterior (touching the eye) and anterior surfaces of the lens, respectively. Different toric prescriptions thus have different axial offsets.

Typically the rotational offset between the ballast and toric features of anterior and posterior mold sections used to form such a lens may be selected by a programmer or operator of an apparatus housing such molds and passed through a complete production cycle to form toric lenses of any desired rotational offset. Such machinery is typically connected to a computer which is programmed to control the operation of the machine. The operator may choose and input the desired rotational offset between the anterior and posterior mold sections which is then transmitted to the appropriate machine parts which control the rotational alignment of the mold sections. The anterior and posterior mold sections may be delivered to the machine through a pair of tubes which are vertically oriented with respect to the apparatus or on a pallet. A receiving plate may be positioned directly beneath the vertically oriented tubes or adjacent to the pallet and can be configured to receive a posterior and anterior mold sections.

The receiving plate may then deposit the posterior mold section at a predetermined position within the apparatus. A posterior mold deposit rod is lowered over the posterior mold section and can lift it upward. The deposit plate may then deposit the anterior mold section onto the top end surface of the anterior mold deposit rod, with the anterior and posterior rods being axial aligned. An axis alignment tool may then be employed to a location between the posterior and anterior mold sections. In this configuration the posterior mold-deposit rod will have been lowered to engage the posterior mold section with the upper-most portion of the axis alignment tool and the anterior mold-deposit rod will have risen vertically until the anterior mold section is engaged with the lower-most portion of the axis alignment tool. Now the posterior and anterior rods may be rotated about their common vertical axis to achieve the desired toric and ballast features for the lens.

A particular quantity of liquid monomer may then be injected into the anterior mold section, and the posterior mold may be moved toward the anterior mold until they engage with a predetermined pressure. The mold sections can then be relocated for curing of the monomer to form the lens. Once the lens has been formed, it is removed from the mold and inspected to confirm that the desired axis angle was achieved.

Accordingly, up to now, measuring the axis angle of a toric lens required measuring the axis angle on the lens itself. However, this requires an extra step during production and increases cycle time. The increase in cycle time can compromise machine output in most high speed automated environments and further compromise the efficiency of the system. Thus, there is a need to reduce this inefficiency when measuring the axis angle of a toric lens.

SUMMARY OF THE INVENTION

In accordance with a first embodiment of the present invention, there is provided a method of measuring an axis angle of a toric contact lens including a posterior toric central zone having a cylindrical axis, and an anterior lens surface forming a ballast that has an axis of orientation offset from the cylindrical axis at a selected rotational angle, the method comprising:

(a) providing anterior and posterior mold sections including respective anterior and posterior mold cavity defining surfaces, wherein the posterior mold cavity defining surface includes a toric central zone and the anterior mold cavity defining surface is shaped to provide the ballast, the mold sections being alignable at multiple rotational positions;

(b) providing a detectable feature on an outer wall of each of the anterior and posterior mold sections at a predetermined angular location with respect to the toric and ballast axes thereof, respectively;

(c) charging the anterior mold section with a predetermined quantity of a polymerizable lens-forming monomer mixture;

(d) rotating the detectable feature of the posterior mold section to a predetermined position relative to the detectable feature of the anterior mold section, wherein the detectable feature of the anterior mold section is a zero reference;

(e) assembling the anterior and posterior mold sections while maintaining the corresponding rotational position; and (f) measuring the axis angle between the detectable feature of the posterior mold section relative to the detectable feature of the anterior mold section.

In accordance with a second embodiment of the present invention, there is provided an apparatus for automatically measuring an axis angle of a toric contact lens including a posterior toric central zone having a cylindrical axis, and an anterior lens surface forming a ballast that has an axis of orientation offset from the cylindrical axis at a selected rotational angle, the apparatus comprising:

(a) an anterior mold section having an anterior mold surface for molding the anterior optical surface of the lens, the anterior mold section having a detectable feature on an outer wall thereof and positioned at a predetermined location on the anterior mold section relative to one of the toric axis and ballast axis thereof;

(b) a posterior mold section having a posterior mold surface for molding the posterior optical face of the lens, the posterior mold section having a detectable feature on an outer wall thereof and positioned at a predetermined location on the posterior mold relative to the one of the ballast axis and toric axis thereof;

(c) means for detecting and positioning the detectable features of each of the anterior and posterior mold sections at a predetermined angular location with respect to each other, wherein the detectable feature of the anterior mold section is at zero reference;

(d) means for rotating the posterior mold section until the detectable feature of the posterior mold section is at the predetermined angular location;

(e) means for depositing a measured quantity of a polymerizable lens-forming monomer mixture into the anterior mold surface;

(f) means for assembling the posterior and anterior mold sections together to form a mold cavity wherein the polymerizable lens-forming monomer mixture is located; and (g) means for measuring the axis angle between the detectable feature of the posterior mold section relative to the detectable feature of the anterior mold section.

The method and system of the present invention advantageously allows for the axis alignment to be measured on an assembled posterior and anterior mold assembly after formation of the toric lens. In this manner, the method of the present invention can be carried out in simple, cost efficient manner by eliminating the need to measure the axis alignment on the lens while simultaneously inspecting for defects thus separating the inspection activities such that the inspection algorithm cycle time is reduced. The method of the present invention therefore allows for the toric axis measurement to take place on an independent station in an automated production system.

DETAILED DESCRIPTION OF THE PREFERRED EMBODIMENTS

Figure 1:
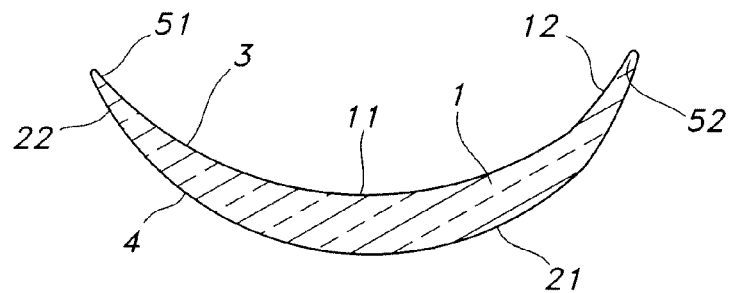
FIG. 1 is a schematic cross-sectional view of a toric contact lens.

FIG. 1 schematically illustrates a representative toric contact lens 1 that may be produced herein. Central zone 11 of posterior surface 3 is toric, i.e., this zone has a toric surface that provides the desired cylindrical correction. Posterior surface 3 may optionally include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 may optionally include at least one peripheral curve 22 surrounding central zone 21.

Lens 1 is provided with a ballast so that the lens maintains a desired rotational orientation on the eye. For example, as schematically shown in FIG. 1, peripheral section 51 may have a different thickness than an opposed peripheral section 52 of the lens periphery. As is known in the art, the ballast is oriented about an axis, and toric contact lens prescriptions define the offset of this axis from the cylindrical axis by a selected rotational angle (usually expressed as number of degrees). As used herein, the term "offset" is inclusive of rotational angles of 0° or 180°, wherein the cylindrical axis is coincident with the ballast axis.

Figure 2:
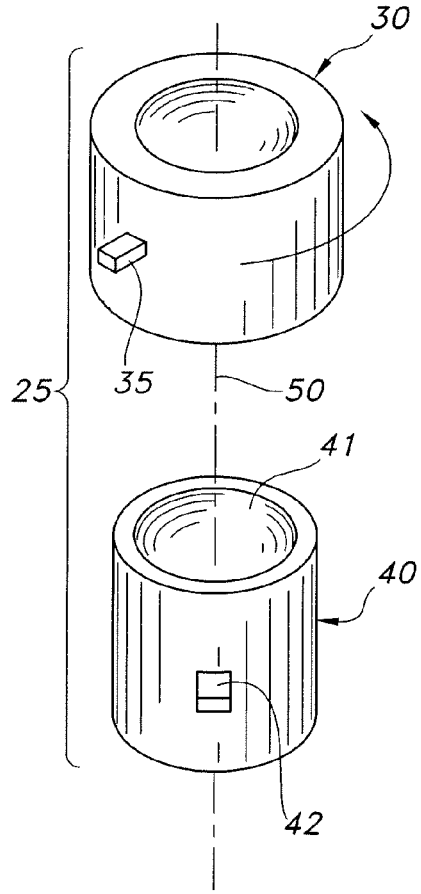
FIG. 2 is a schematic exploded view of a mold assembly.
Figure 3:
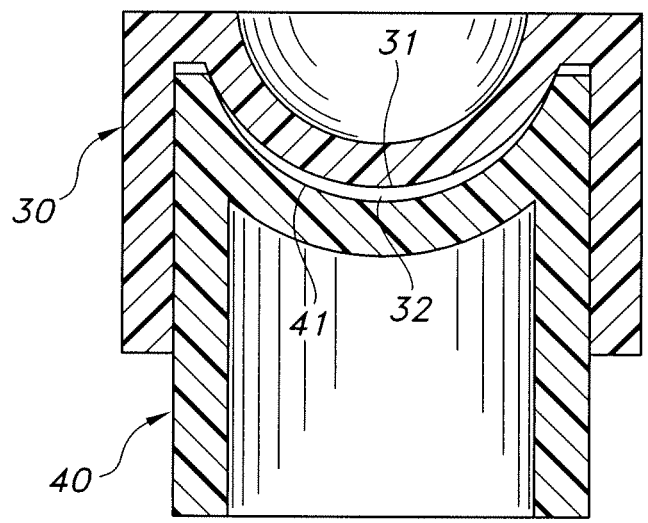
FIG. 3 is a schematic cross-sectional view of an assembled mold assembly.

A representative mold assembly 25 for the method of this invention is shown in FIGS. 2 and 3. The mold assembly includes posterior mold 30 having a posterior mold cavity defining surface 31 (which forms the posterior surface of the molded lens), and anterior mold 40 having an anterior mold cavity defining surface 41 (which forms the anterior surface of the molded lens). Each of the mold sections is injection molded from a plastic resin in an injection molding apparatus.

When the mold sections are assembled, a mold cavity 32 is formed between the two defining surfaces that correspond to the desired shape of the contact lens molded therein. Accordingly, posterior mold cavity defining surface 31 has a toric central zone (for forming the toric posterior surface of the toric contact lens) having a cylindrical axis, and anterior mold cavity defining surface 41 has a configuration that will provide ballast to a lens molded in molding cavity 32. Of course, surfaces 31 and 41 may also include curves for forming desired peripheral curves on the lens, and the central zones of surfaces 31 and 41 may be designed to provide a desired spherical correction to the molded toric lens.

In cast molding toric contact lenses from a mold assembly according to the present invention, the rotational alignment of the anterior and posterior mold sections can be adjusted to correspond with the selected offset between the cylindrical axis and the ballast, thus avoiding the random relative positioning of the mold sections. In addition, the same types of anterior and posterior mold sections can be aligned at multiple rotational positions. Accordingly, the same types of anterior and posterior mold sections can be used to mold toric lenses with different axes offsets, thereby reducing significantly the number of unique tools needed.

Figure 2A:
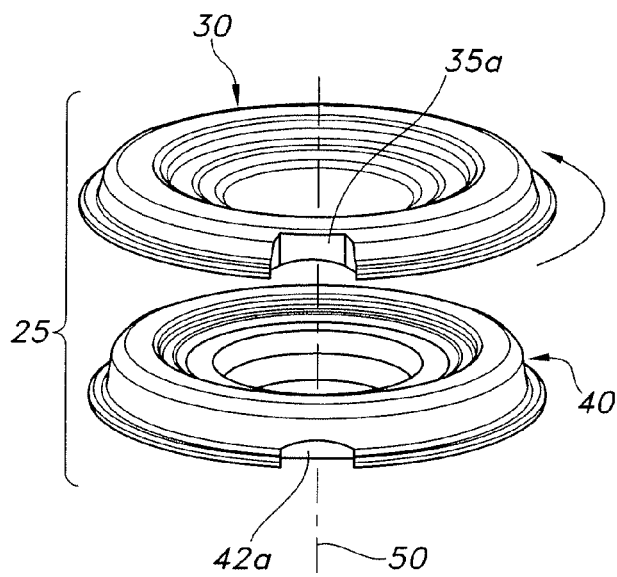
FIG. 2A is a schematic exploded view of another embodiment of a mold assembly.

As shown schematically in FIGS. 2 and 2A, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration generally shown in FIG. 3 while maintaining the selected rotational position.

The desired rotational positioning of the mold sections will be described with reference to the embodiment illustrated in FIGS. 2 and 4. Anterior mold section 40 includes a detectable feature 42, such as a flange, which is formed on the outer wall of mold section 40 and positioned at zero reference, thereby ensuring that anterior mold section 40 can be aligned at a known position. Posterior mold section 30 includes detectable feature 35, such as a flange, which is formed on the outer wall of mold section 30, whereby the rotation of detectable feature 35 of posterior mold section 30 about axis 50 can be determined. After rotating detectable feature 35 of posterior mold section 30 about axis 50 until alignment of detectable feature 35 is adjusted at the selected rotational position, mold sections 30 and 40 are then assembled while maintaining the selected rotational position.

In another embodiment shown in FIG. 2A, anterior mold section 40 includes a detectable feature 42a which is formed on the outer wall of mold section 40 and positioned at zero reference, thereby ensuring that anterior mold section 40 can be aligned at a known position. Posterior mold section 30 includes detectable feature 35a which is formed on the outer wall of mold section 30, whereby the rotation of detectable feature 35 of posterior mold section 30 about axis 50 can be determined. After rotating detectable feature 35a of posterior mold section 30 about axis 50 until alignment of detectable feature 35a is adjusted at the selected rotational position, mold sections 30 and 40 are then assembled while maintaining the selected rotational position.

Prior to assembling the mold sections, a polymerizable lens-forming monomer mixture is introduced into the mold section. Subsequent to assembling the mold sections, the polymerizable lens-forming monomer mixture is polymerized, such as by exposure to UV light or heat, followed by disassembling the mold assembly and removing the molded lens therefrom. Other processing steps which may be included, depending on the specific process, such as lens inspection and lens packaging.

Figure 4:
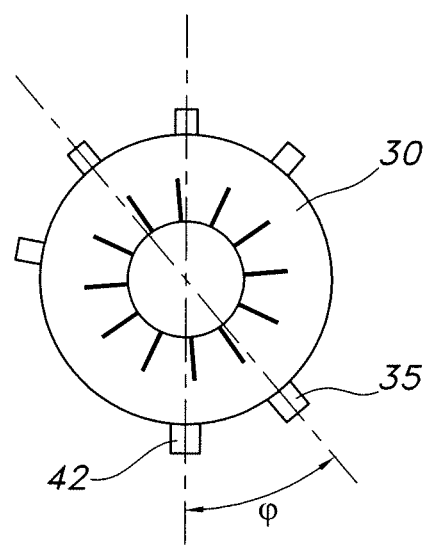
FIG. 4 is a schematic top view of an assembled mold assembly.

As shown in FIG. 4, the axis angle between detectable feature 35 of the posterior mold section 30 relative to detectable feature 42 of anterior mold section 40 after rotational displacement of the mold sections is measured. The axis angle between detectable feature 35 of the posterior mold section 30 relative to detectable feature 42 of anterior mold section 40 after rotational displacement of the mold sections can be measured prior to, or subsequent, to the curing of the polymerizable lens-forming mixture in the lens-shaped cavity of the assembled mold sections to form the toric contact lens. The axis angle is measured by first determining the center of the mold pairings detectable features. Generally, this is a function of the toolset of any known automatic vision system such as, e.g., U.S. Pat. No. 6,788,399. Typically, the circumference is identified and the center calculated. The detectable features are then identified around the circumference and the angle with reference to a horizontal or vertical reference axis extended from the center of the mold is calculated by methods known in the art.

A further advantage of the method of this invention is that it permits practical and cost effective cast molding of toric contact lenses having more complicated geometry, especially multifocal toric contact lenses.

For this embodiment, the toric contact lens has an anterior multifocal surface. Accordingly, both the multifocal optics and the ballast are "built into" the anterior surface of the lens.

For purposes of illustration, multifocal contact lenses can be divided into two classes.

First, multifocal lenses include those which are radially symmetric about a diameter of the lens, such as concentric bifocal contact lenses. For cast molding this class of toric multifocal contact lenses by the present invention, mold defining surface 41 of the anterior mold section 40 is shaped to provide the multifocal optical surface in addition to providing ballast. The anterior mold sections are injection molded from injection molding tools having this desired optical surface by conventional methods. Second, multifocal lenses include those which are not radially symmetric, such as translating multifocal contact lenses, or lenses including distinct near and far vision zones. Lenses in this class generally must maintain a specific orientation on the eye to achieve proper multifocal vision. Accordingly, for cast molding this latter class of toric multifocal contact lenses, mold defining surface 41 is provided with the desired multifocal optical surface, as discussed above, and surface 41 is also designed so that the multifocal optical surface thereon is oriented with respect to the ballast provided in surface 41. Since both the multifocal optics and the ballast are provided by the anterior mold section, the posterior and anterior mold sections may still be rotationally aligned at multiple rotational positions.

It will be understood that various modifications may be made to the embodiments disclosed herein. Therefore the above description should not be construed as limiting, but merely as exemplifications of preferred embodiments. For example, while there is shown and described herein monomers, copolymers, matrix controlled diffusion drug delivery systems and methods of making and using the same, it will be manifest to those skilled in the art that various modifications may be made without departing from the spirit and scope of the underlying inventive concept. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A method of measuring an axis angle of a toric contact lens including a posterior toric central zone having a cylindrical axis, and an anterior lens surface forming a ballast that has an axis of orientation offset from the cylindrical axis at a selected rotational angle, the method comprising:
   (a) providing anterior and posterior mold sections including respective anterior and posterior mold cavity defining surfaces, wherein the posterior mold cavity defining surface includes a toric central zone and the anterior mold cavity defining surface is shaped to provide the ballast, the mold sections being alignable at multiple rotational positions;
   (b) providing a detectable feature on each of the anterior and posterior mold sections at a predetermined angular location with respect to the toric and ballast axes thereof, respectively;
   (c) charging the anterior mold section with a predetermined quantity of a polymerizable lens-forming monomer mixture;
   (d) rotating the detectable feature of the posterior mold section to a predetermined position relative to the detectable feature of the anterior mold section, wherein the detectable feature of the anterior mold section is a zero reference, and wherein the step of rotating the detectable feature of the posterior mold section is carried out after charging the anterior mold section with the predetermined quantity of the polymerizable lens-forming monomer mixture;
   (e) assembling the anterior and posterior mold sections while maintaining the corresponding rotational position; and
   (f) measuring the axis angle between the detectable feature of the posterior mold section relative to the detectable feature of the anterior mold section, wherein the step of measuring the axis angle is carried out prior to curing of the polymerizable lens-forming monomer mixture.

2. The method of claim 1 wherein at least one of the detectable features on each of the mold sections is identifiably distinct from any other detectable feature on each of the mold sections.

3. The method of claim 1, wherein the detectable feature of the posterior mold section and the anterior mold section is a flange.

4. The method of claim 1, wherein the mold sections are maintained at the corresponding rotational position throughout curing of the polymerizable lens-forming monomer mixture.

5. The method of claim 1, wherein the mold sections are alignable only at rotational positions incrementally varying by about 5 degree or about 10 degree increments.

6. The method of claim 1, wherein the mold sections are alignable at any rotational position.

7. The method of claim 1, wherein the anterior mold cavity defining surface further includes a spherical central zone.

8. The method of claim 1, wherein the anterior mold cavity defining surface further includes a multifocal central zone.

9. The method of claim 1, wherein the step of measuring the axis angle comprises calculating the circumference of one of the mold sections, determining the center thereof; identifying the detectable features around the circumference and measuring the angle there between.

\* \* \* \* \*